United States Patent
Pan et al.

[11] 3,791,795
[45] Feb. 12, 1974

[54] INTERBED SEAL FOR MULTIBED REACTORS

[75] Inventors: Bingham Y. K. Pan; John R. Garton; Robert V. Parker, all of Texas City, Tex.

[73] Assignee: Monsanto Company, Saint Louis, Mo.

[22] Filed: Nov. 19, 1971

[21] Appl. No.: 200,512

[52] U.S. Cl............ 23/288 R, 23/252 R, 252/477, 260/669
[51] Int. Cl............................................. B01j 9/04
[58] Field of Search ...... 260/669 R; 208/49, 56, 59, 208/147, 210; 23/288 R; 252/477

[56] References Cited
UNITED STATES PATENTS

| | | | |
|---|---|---|---|
| 2,212,583 | 8/1940 | Broderson et al.............. | 23/288 R |
| 2,893,852 | 7/1959 | Montgomery................... | 23/288 R |
| 2,905,633 | 9/1959 | Rosinski......................... | 23/288 R |
| 3,112,256 | 11/1963 | Young et al. .................. | 23/288 R |
| 3,218,249 | 11/1965 | Ballard et al................... | 23/288 R |
| 3,326,996 | 6/1967 | Henry et al. ................... | 260/669 R |
| 3,492,220 | 1/1970 | Lempert et al. ................ | 208/210 |
| 3,498,756 | 3/1970 | Carson........................... | 260/669 R |
| 3,515,763 | 6/1970 | Uitti............................... | 260/669 R |
| 3,607,000 | 9/1971 | Beal et al........................ | 208/216 |

*Primary Examiner*—Curtis R. Davis
*Attorney, Agent, or Firm*—Thomas B. Leslie; Donald W. Peterson

[57] ABSTRACT

An improved interbed seal for fixed multibed vapor phase catalytic reactors which provides minimum leakage between beds operated under different conditions or with different reactant concentrations. The improved seal consists in a floating seal of a plurality of layers of different sizes of finely divided inert material of increasing size from the center of the seal to the adjacent catalyst beds. The improved seal offers efficient sealing, economy of cost and ease of charge and discharge together with the plurality of catalyst beds for regeneration or recharging fresh catalysts. The preferred finely divided inert material is well-sieved sand of a plurality of different size ranges from smaller than 100 mesh to one-eighth inch.

12 Claims, 3 Drawing Figures

PATENTED FEB 12 1974

3,791,795

INVENTORS
BINGHAM Y. K. PAN
JOHN R. GARTON
ROBERT V. PARKER

BY Thomas B. Leslie
ATTORNEY

INTERBED SEAL FOR MULTIBED REACTORS

BACKGROUND OF THE INVENTION

The present invention relates to an improved interbed seal for multibed catalytic reactors. More particularly, it relates to such improved interbed seal for catalytic reactors of a plurality of catalyst beds for use in vapor phase catalytic reactions.

There have recently been proposed the employment of catalytic reactors for carrying out vapor phase catalytic reactions in which a single reactor shell is provided with a plurality of catalyst beds in place of the use of separate reactors for each separate catalyst bed employed. Such multibed reactors afford efficiencies and economies in the design and construction of catalytic reactors. In some catalytic conversion processes it has been found expedient to carry out the reaction over two or more different catalysts or under somewhat different conditions of temperature and pressure in different catalyst beds. Furthermore, in some such processes it has been proposed to add or withdraw reactants to the vapor stream after one such catalytic reaction and prior to another one or more of such reactions. In all the above instances it is necessary that the plurality of beds of catalysts be separated from each other by sealing means to prevent or diminish insofar as possible any leakage of reactant vapors from one such catalyst bed into another.

It is apparent that such sealing could take the form of solid metallic plates fixed to the reactor shell to achieve such sealing, but in such a design much of the economy and efficiency of the multibed reactor would be lost because of the necessity for providing separate catalyst charging and discharging openings and means in each separate section of such reactor having a separate bed of catalyst. Therefore, there have been proposed various types of seals which are not fixedly attached to the sides of the catalyst vessel, but can be charged and discharged along with the entirety of the plurality of beds of catalysts when necessary. However, none of the sealing means heretofore proposed for this purpose have proved satisfactory since, due to differential expansion and contraction with large changes in temperatures, or embrittlement and destruction at high temperatures, the seal against passage of vapors has not been effective and much leakage of vapors has ensued.

SUMMARY OF THE INVENTION

It is therefore an object of the present invention to provide an improved seal for fixed multibed catalytic vapor phase reactors.

A further object is to provide a seal for fixed multibed catalytic reactors which is a free-floating seal.

Another object is to provide a seal for fixed, multibed catalytic reactors which is inert with respect to the reaction vapors contacted.

A still further object is to provide an economical and effective improved seal for fixed multibed catalytic reactors.

These and other objects of the present invention will become apparent from the drawings, description herein and appended claims.

The improved interbed seal of the present invention for use in fixed multibed vapor phase catalytic reactors consists in a floating seal comprised of a plurality of layers of finely divided inert material of increasing size from the center of the seal in both directions to the adjacent catalyst beds. Generally, the layer of greatest thickness will be the center layer comprised of the smallest size inert material, since this size will have the greatest bulk density, i.e. the smallest volume of void space for a given total volume of material, and hence the greatest vapor sealing effect. The outer layers of finely divided inert material will be of increasing particle size but of lesser thickness, since the chief function of such one or more layers of larger particle size is to prevent the falling or migration of the finer size inert material into the adjacent catalyst beds. In general, and depending upon the average size of catalyst particles or pellets making up the catalyst beds, one, two or more layers of inert material of increasing particle size are employed in the improved seal of this invention.

The improved vapor seal of the present invention has been found to possess many advantages not present in other types of floating seals. These include maintaining a positive seal at reactor walls subject to expansion and contraction with temperature, maintaining a positive seal under vibration forces induced by operation, resistance to sintering or embrittlement at high temperatures with no impairment of free flow of the sealing materials, and chemically inert to the reactions conducted in the reactors employing such improved seals.

DESCRIPTION OF PREFERRED EMBODIMENTS

Figure 1:
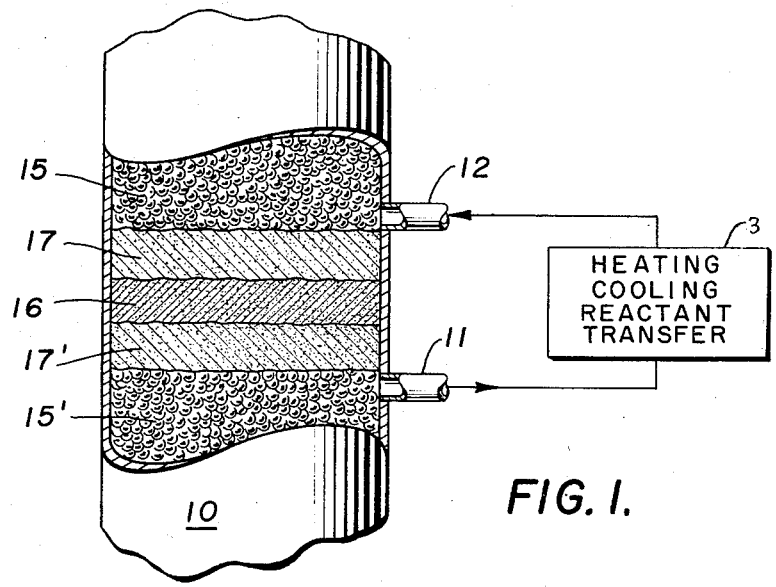
FIG. 1 is an elevation view of a portion of a multi-bed reactor employing the seal of the present invention.

The description of the composition and manner of use of the improved seal of the present invention can be better appreciated with reference to the drawings. Referring to FIG. 1 of the drawings there is illustrated a portion of a fixed catalyst bed, multibed reactor 10 having ports 11 and 12 for the ingress and egress of the reactant vapors. A portion of two catalyst beds 15 and 15' are shown. Shown schematically at 13 is the transfer piping between ports 11 and 12 or, in the alternative any desired treating facilities for treating the reactant vapors between the two catalyst beds, such as a heater for adding additional heat of the shell and tube or any other desired type, a heat exchanger for cooling the reactant vapor or additional transfer lines for withdrawing and/or charging vaporized reactants if such is desired. Since the treatment or transfer performed intermediate the catalyst beds, if any, forms no part of the present invention, such treatments will not be further discussed. The improved seal itself is positioned in direct contact with the top of the lower catalyst bed 15' and the bottom of the upper catalyst bed 15. The seal consists of a layer of the smallest size of finely divided inert materials such as finely divided inert materials of a particle size of 75 mesh or smaller and adjacent layers of 17 and 17' of finely divided inert material of slightly larger particle size intermediate the size of the smallest size layer 16 and the size of the catalyst particles or pellets in the respective beds of catalysts 15 and 15'. Thus, in its simplest embodiment the novel improved seal of the present invention comprises a minimum of three layers of finely divided inert material with a smaller size layer positioned between two adjacent layers of somewhat larger size finely divided inert material and the succussion of layers of finely divided inert material serving to separate the beds of catalyst particles or pellets.

Figure 2:
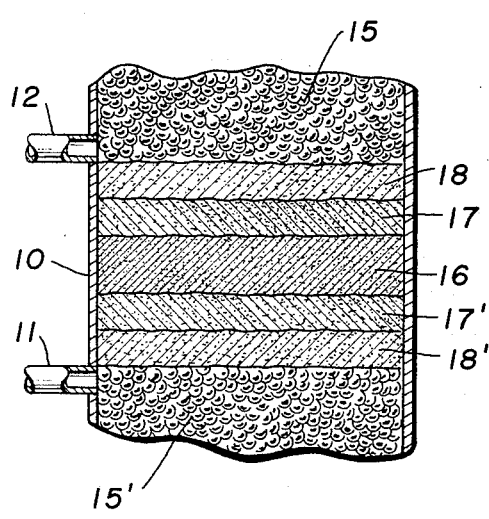
FIG. 2 is a view of another form of the seal of the present invention.

In FIG. 2 there is illustrated a somewhat more effective improved seal which employs a series of five layers of finely divided inert material, layer 16 being of the smallest particle size ranging, for example, from about 75 to 140 mesh, layers 17 and 17' being of the next smallest particle size, for example from about 20 to about 80 mesh and layers 18 and 18' being of still larger particle size but smaller than the size of the catalyst particles or pellets in the adjacent catalyst beds 15 and 15', for example from about one-eighth inch to 20 mesh in size.

Figure 3:
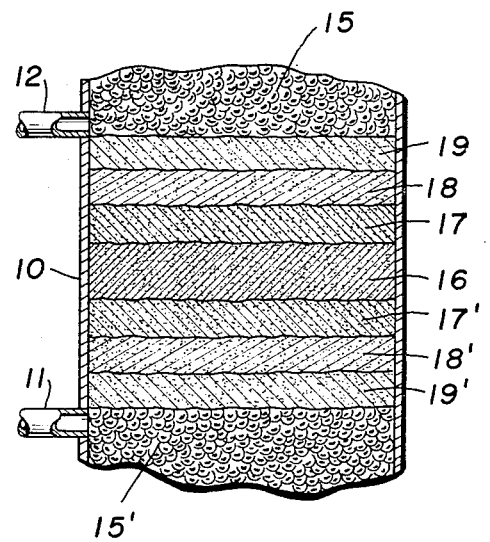
FIG. 3 is a view of still another form of the seal of the present invention.

In FIG. 3 there is illustrated a still more preferred and efficient improved seal. In that instance the seal consists of some seven layers of finely divided inert material wherein again the central layer 16 is composed of the smallest size material, the next adjacent layers 17 and 17' of an intermediate size material, for example from about 30 to 80 mesh, the next adjacent layers 18 and 18' being composed of slightly larger particle size material, for example from about 10 to 20 mesh and layers 19 and 19' being composed of the largest size inert material up to the size of the catalyst particles in the adjacent beds, for example from about one-eighth inch to about 16 mesh.

It will be apparent that the number of layers in the improved seal and the thickness thereof will depend on the degree of vapor sealing required and the particular application of the seal, the differential in pressures against which the seal must be effective, and the size of the catalyst particles or pellets in the beds to be separated and vapor sealed. Thus, if catalyst particles of relatively fine particle size, those ranging in size from about one-sixteenth inch and smaller particles, are to be sealed then it will require a smaller number of layers of the finely divided inert material and the layers next adjacent to the catalyst beds need only be of a size slightly smaller than the catalyst particles to effect both sealing and prevention of distribution of the finer sealing means into the catalyst beds. On the other hand, if the catalyst should be in the form of larger size pellets or prills an effective seal of finely divided inert material may require either more layers of the material and/or larger particle size of finely divided inert material in the outermost layers adjacent to the catalyst beds in order to prevent migration of the inert sealing material into those beds of catalysts. In the case of relatively large forms of catalyst pellets ranging up from three-eighths inch and larger in size which would create rather large void spaces between those pellets it may be advisable to place a screen or fabric of either ceramic or metal above the catalyst bed and beneath the first outermost layer of sealing material to prevent migration thereof into the catalyst beds. The reliance on such an alternative screen, fabric or other dividing means will depend upon the size of catalyst with which the seal is employed. When employed such fabric or screen dividers should be free floating and not attached to the walls of the reactor.

In general, the sealing effect is achieved by the smallest sized materials and hence the effectiveness of the seal is determined by the depth of the layer of this finest material. Hence, this central layer of the finest size is generally of a greater depth than the remaining layers of larger particle size. In general, such a layer will constitute from 45 to 96 percent of the total depth of the seal and the adjacent layers may constitute from 3 to 55 percent of such depth. Likewise, it is normally found that the larger particle size layers adjacent to a lower catalyst bed will be required to resist falling through of the finer size material and hence these lower adjacent layers are frequently made deeper than the layers above the finer size layer and adjacent an upper catalyst bed.

An entirely suitable seal of the type illustrated in FIG. 3 when the finest layer constitutes from 40 to 70 percent of the seal depth and the three lower larger particle sized layers each range from 7 to 10 percent of the total seal depth while the three upper larger particle sized layers each range from 3 to 7 percent of the total seal depth. This very suitable distribution of particle size layers is illustrative only and may be widely varied to suit the particular sizes and types of catalysts with which the seal is employed.

As indicated above the greatest sealing effect is produced by the finest particle size inert material, those finer than 70 mesh, and comparatively little sealing effect is produced by the larger particle sized layers. Hence, the degree of vapor sealing approaches a linear function of the depth of the layer of finest sealing material. Thus, it has been found that at a pressure differential of 2 psig and with a seal of the type illustrated by FIG. 2 having a depth of one-half foot of sugar sand of 80 to 120 mesh, two layers of larger particle sizes of sand 2 inches deep below the finest sand layer and two layers of the same larger sized sand of 1 inch depth above the finest sand layer, the vapor flow through a four foot bed can be reduced to 6 percent of that through a 4 foot bed of catalyst alone. Likewise, the vapor flow through such four foot bed can be reduced by a further one-half or to 3 percent of that through the catalyst bed by a similar seal having a one foot depth of the same fine sand of 80 to 120 mesh with no change in the total of six inch depth of the lower and upper larger sized sand layers. This approximate linearity of sealing effect is found to hold across a wide range of pressure differentials and depth of seal.

The finely divided inert materials useful in the improved vapor seal of the present invention are any inorganic materials which are inert to the reactants and catalysts at the conditions of use. In general, all forms of finely divided silica meet this criterion including common sand, quartz sand, quartzite sand, ilmenite sand, comminuted flint and the like. Many other metal oxides will usually be found inert at the conditions of use such as alumina, zirconia, titania, beryllia and the like. Likewise, most common glasses will be found to be inert under the conditions of use and can be employed in the form of frits, beads and the like. It is a relatively convenient matter to submit the finely divided materials to the reactant vapors to be contacted under the temperature and flow conditions of use in order to establish that materials are inert to the specific catalysts and reactants which are to be sealed under the conditions of use.

Since silica sand is among the most available of such materials occurring free in nature it is also one of the most economical and convenient of the finely divided inert sealing materials suitable for the improved vapor seal in the present process. The tests described in the following examples have been conducted generally with such commercially available sands. In addition to the commercial designation of the sands used in the following examples, such sands have been characterized by the range of mesh sizes of each type of sand in accordance with U.S. Standard Sieve Scale by the U.S. Bureau of Standards.

The examples which follow will serve to illustrate the utility and efficacy of the novel improved vapor seals of the present invention.

EXAMPLE I

A test column was prepared consisting of a four-foot length of 5 ½ inch internal diameter transparent cylinder with a typical dehydrogenation catalyst of nominal one-eighth inch pellets. Provision was made for metering the flow rates of air both into and out of the test column. Several runs were carried out in this test column at typical pressure differentials between the lower and upper portions thereof and the flow rates of air in each instance determined. The control run consisted of the column packed in its entire four-foot length with the nominal one-eighth inch catalyst pellets alone, i.e. with no seal present, and the flow rate through this catalyst bed at typical pressure drop conditions determined. Thereafter several seals of the present invention of the type illustrated in FIG. 2 were tested in this column with beds of the same nominally one-eighth inch catalyst pellets positioned both below and above the seals tested. The seals of the present invention of nominally one foot, 18 inches and two feet comprised (1) a seal of 6 inches of the sugar sand of 80 to 120 mesh, (2) a seal of 12 inches of sugar sand of 80 to 120 mesh, and (3) a seal of 18 inches of sugar sand of 80 to 120 mesh, all seals having 2 adjacent layers both below and above the sugar sand. The 2 layers below comprised a first layer adjacent to the sugar sand of 2 inches of grade 4 sand of 30 to 80 mesh and the next layer adjacent to the catalyst pellets composed of 2 inches of filter sand of one-eighth inch to 16 mesh, while the upper layers comprise 2 layers of 1 inch depth each of the same 2 sands, the grade 4 sand adjacent to the sugar sand and the filter sand adjacent to the upper catalyst bed. Air flow rates through the various seals were determined in the same manner as that for the catalyst bed alone and are set forth in Table I below:

| 4-Foot Packed Bed | Air Flow at Δ P of 2.2 psi | |
|---|---|---|
| | Cu.ft./min. | % |
| No seal | 47.0 | 100 |
| (1) Nominal 1' seal (6" sugar sand) | 2.8 | 6 |
| (2) Nominal 1 ½' seal (12" sugar sand) | 1.4 | 3 |
| (3) Nominal 2' seal (18" sugar sand) | 0.93 | 2 |

It can be seen that the air flows through the 18 inch seal (2) and the two foot seal (3) were respectively only 3 percent and 2 percent of that through the unsealed catalyst bed at the 2.2 psig pressure differential tested.

EXAMPLE II

Thereafter several different types of floating seals were tested for sealing of the column. The seals tested included (4) a 1 foot seal of three two-inch layers of steel wool separated by two layers of three inches of α-alumina and with three sheets of stainless steel foil just above the second layer of steel wool, and (5) a 1 foot seal of three layers of Fiberfrax cloth of one-fourth inch thickness with 10 ½ inches of Fiberfrax blanket positioned above the cloth and three layers of Fiberfrax cloth above the blanket.

It was further found in the above tests that seals of types (4) and (5) developed serious problems upon compression with air pressure to a pressure differential of 1 ½ psig or greater. In these cases the seal composed of steel wool and foil and those of Fiberfrax cloth and Fiberfrax blanket developed void spaces at the walls of the column of depths ranging from one-fourth inch to 4 inches. When the air pressure was released and reimposed a portion of the compression was released but all the three seals were found to remain somewhat displaced and to have an uneven seal against the wall of the column in every case. Consequently the seal efficiency was drastically decreased.

EXAMPLE III

In separate tests on shorter test cylinders with seals of the same type as (4) and (5) it was found that upon slight shaking or vibration the α-alumina or sand positioned above the various seals fell freely between the wall of the cylinder and sealing elements into the catalyst bed below in each case. Likewise, when tests at higher temperatures approximating operating temperature above 580°C were conducted, it was found that the steel wool suffered embrittlement and was easily fractured while the Fiberfrax cloth and blanket lost approximately 26 percent of its weight burning off of the organic carrier present as well as demonstrating a smaller thermal expansion coefficient than that of the steel reactor walls in which it was tested. All these indicate that the two types of seals cannot sustain the reactor operating conditions and cannot maintain their sealing effect.

A further test was conducted on the two-foot seal (3) described in Example I above in which a portion of the catalyst bed below the seal was drawn off through a side opening and the lowering of the seal portion followed. The seal was found to drop evenly down the column without tilting due to the fluidity of the sand particles. It was also found after such a nominal two-foot seal was deliberately disturbed by lowering the catalyst so that some slight mixing occurred with the catalyst bed that the seal effect as demonstrated by the air flow through same was decreased by only 7 percent in comparison with the undisturbed two-foot seal.

EXAMPLE IV

Additional tests of the seals of the present invention were made to establish the integrity of such seals against the effects of vibration during use. In this test there was prepared a test column of approximately 9 inches in length and 4 ⅜ inches internal diameter composed of a base of 2 inches of the nominal one-eighth catalyst pellets and a sand seal of the type illustrated in FIG. 3 composed of seven discrete layers of four different grades of sand. Approximately one-inch layers of each grade of sand were placed in the test column in the order from the catalyst bed in the bottom as follows: filter sand (one-eighth inch to 16 mesh), grade 1 sand (10–20 mesh), grade 4 sand (30–80 mesh), sugar sand (80–120 mesh), grade 4 sand (30–80 mesh), grade 1 sand (10–20 mesh) and filter sand (one-eighth inch to 16 mesh). The test column was subjected to vibrations from 2 to 7,800 cycles per second at 0.01 to 1.1 G for 7 ½ hours on a sieve vibrator. It was observed that only a few small particles from the lowest layer of filter sand were trapped in the upper one-half inch of the catalyst bed and that no other fines fell into the catalyst bed over the entire period of the test. In contrast, when a mixture of the sugar sand and grade 4 sand was used to replace the layer of grade 4 sand in the above configuration considerably more fines fell into the catalyst bed after only one-half hour of vibration. This was presumably because the mutual seal effect between sand layers was diminished by the excessively different sizes in the mixed layer.

(A.) A further test of the settling or packing tendencies of the sands composing the seal of the present invention and the one-eighth inch catalyst pellets was conducted in the same manner as above. Nine-inch test cylinders of each of the four grades of sand and the catalyst pellets were subjected to vibration of 4 ½ to 7,800 cycles per second at 0.01 to 1.1 G until no further settling was observed, generally about 7 to 8 hours. The maximum settling percent from the original starting depth of each sample is set out below.

TABLE II

| Material | Max. settling % |
| --- | --- |
| ⅛" catalyst pellets | 9.5 |
| Sugar sand (80–120 mesh) | 11.5 |
| Grade 4 sand (30–80 mesh) | 11.0 |
| Grade 1 sand (10–20 mesh) | 9.0 |
| Filter sand (⅛" – 16 mesh) | 11.5 |

It will be seen that all the materials settle under vibration at rates that are not grossly different.

EXAMPLE V

Seals of the present invention of the type illustrated in FIG. 3 were tested in a laboratory reactor under typical conditions of a fixed bed catalytic reactor in which the dehydrogenation of the ethylbenzene to styrene is conducted. The tests were designed to determine if the sand seals were chemically inert with respect to the reaction system underway and the activity of the catalyst employed.

A laboratory reactor 4 feet long and 1 ⅜ inches in internal diameter was loaded with a lower 18-inch bed of one-eighth inch dehydrogenation catalyst, a one-foot seal of seven layers of four grades of sand and an upper 18-inch bed of catalyst. The seal comprised in ascending order 2 ½ inches of filter sand (one-eighth inch – 16 mesh), 2 inches of Grade 1 and (10–20 mesh), 1 ¼ inches of Grade 4 sand (30–80 mesh), ½ inch of sugar sand (80–120 mesh), 1¼ inches of Grade 4 sand, 2 inches of Grade 1 sand and 2½ inches of filter sand. Means for taking vapor samples at the end of each section were provided and the vapor samples were analyzed by a gas chromatograph.

In this Test (A) the entire reactor was operated isothermally at 580°C to 600°C. Feed to the upper catalyst bed was 4 g. per minute of ethylbenzene and steam at a rate of 2.2:1.0 by weight in relation to the ethylbenzene. The styrene content of the vapor sample upon entering the sand seal was the same as upon the exit therefrom, approximately 40 to 50 percent. The gas chromatographic analysis also indicated the high boiling components, $\alpha$-methylstyrene, vinyl toluene and $\beta$-methylstyrene, were the same between the inlet and outlet of the sand seal. These results showed that the sand seal of this invention is inert to the reaction system and catalyst activity.

(B) A second test was conducted in which the upper 18 inches of the reactor was composed of catalyst and the lower 30 inches of a sand seal. The seal comprised 1 inch of sugar sand, 2 inches of Grade 4 sand, 3 inches of Grade 1 sand and 24 inches of filter sand. In this test (B) the reactor was operated at a temperature of 620°C and the feed rates were adjusted to 3.5 g. per minute of ethylbenzene and 1.4 times by weight of stream so as to produce a vapor containing 30 to 35 percent styrene at the entry of the sand seal. The test was run for 400 hours during which no additional decomposition of ethylbenzene or other aromatics within the sand seal could be detected. The pressure differential across the column remained at approximately 2.5 psig throughout the test. Upon completion of the test the catalyst and sand were inspected and no unusual carbon deposit or any breakdown of particles was found. Thus, the sand seal of the invention was shown to be inert to the reaction underway and the reaction products thereof.

There has thus been demonstrated the superior properties of the improved vapor seal of the present invention with respect to other types of floating seals. The improved seal of this invention is effective to substantially seal against vapor flow between separate beds of catalyst in multibed vapor phase catalytic reactors. Such a seal has been found to maintain its positive seal at reactor walls at operating temperatures and while subject to vibration while likewise resisting sintering, embrittlement or restriction in seal particle mobility at such high temperatures. The improved seal has also been shown to be inert to the reaction and to the catalyst activity at typical operating temperatures and not to be subject to fouling with carbon at such temperatures.

What is claimed is:

1. A floating vapor barrier for separating catalyst beds in a multibed vapor phase catalytic reactor which comprises a plurality of layers of finely divided inert material, the central layer of said inert material comprising a size not greater than 70 mesh, and at least one upper and lower layer of finely divided inert material of a size greater than 70 mesh between the central layer and the adjacent catalyst beds.

2. The vapor barrier of claim 1 wherein the inert material ranges in size from smaller than 100 mesh to about one-eighth inch.

3. The vapor barrier of claim 1 wherein the finely divided inert material comprises glass, sand, quartz sand, quartzite sand, ilmenite sand, flint, alumina, titania, zirconia or beryllia.

4. The vapor barrier of claim 1 wherein the finely divided inert material comprises sand.

5. The vapor barrier of claim 4 wherein the sand ranges in size from smaller than 100 mesh to about one-eighth inch.

6. The vapor barrier of claim 1 wherein the layers of inert material comprises a layer of 75 mesh or smaller size and adjacent upper and lower layers of greater than 75 mesh size.

7. The vapor barrier of claim 1 wherein the layers of inert material comprise a layer of from about 75 to about 140 mesh size, adjacent layers of from about 20 to about 80 mesh size and upper and lower layers of greater than about 20 mesh size.

8. The vapor barrier of claim 1 wherein the layers of inert material comprise a layer of from about 80 to about 120 mesh size, adjacent layers of from about 30 to about 80 mesh size, next adjacent layers of from about 10 to about 20 mesh size and upper and lower layers of from about one-eighth inch to about 16 mesh size.

9. The vapor barrier of claim 8 wherein the inert material comprises well-sieved sand.

10. The vapor barrier of claim 1 wherein a free-floating metallic or ceramic screen or fabric is interposed between the lowest layer of finely divided inert material and the catalyst bed below said seal.

11. The vapor barrier of claim 1 wherein said central layer comprises from 40–96 percent of the total depth of said inert material.

12. The vapor barrier of claim 1 wherein said central layer comprises from 40–70 percent, each lower layer comprises from 7–10 percent and each upper layer comprises from 3–7 percent of the total depth of said inert material.

* * * * *